Figure 1:
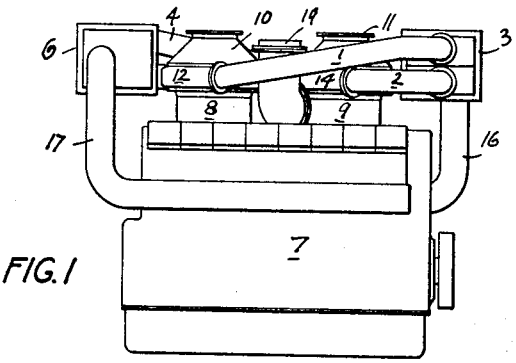

March 27, 1956  R. SEIFERT ET AL  2,739,440
SUPERCHARGER PLANT FOR INTERNAL COMBUSTION ENGINES
Filed March 14, 1955  2 Sheets-Sheet 1

INVENTORS:
RICHARD SEIFERT
HANS REITER
BY K. A. Mayr
ATTORNEY.

INVENTORS:
RICHARD SEIFERT
HANS REITER
BY K. A. Mayr
ATTORNEY.

United States Patent Office 2,739,440
Patented Mar. 27, 1956

2,739,440
SUPERCHARGER PLANT FOR INTERNAL COMBUSTION ENGINES

Richard Seifert, Friedrichshafen, and Hans Reiter, Weingarten, Germany, assignors to Maybach-Motorenbau G. m. b. H., Friedrichshafen, Germany, a firm of Germany Application March 14, 1955, Serial No. 494,202

Claims priority, application Germany April 9, 1954

5 Claims. (Cl. 60—13)

The present invention relates to supercharging plants for internal combustion engines having a plurality of specularly arranged rows of cylinders, for example in the shape of a V, X, H, triangle, or square.

The supercharging plant includes at least two exhaust gas turbine driven radial compressors having axial air inlets, the shafts of the compressors being vertical and placed approximately in the longitudinal median plane of the engine. The supercharging plant also includes two compressed air coolers. The supercharging plant according to the invention is compact, requires little space, and is easily visible for the following reasons:

(1) Each compressor has two diametrically opposed compressed air outlets connected with the coolers for the charging air by means of conduits extending parallel to the longitudinal axis of the engine.

(2) The charging air coolers are arranged at the ends of the engine.

(3) A first charging air conduit connects one cooler with the inlets of the cylinders forming one row and a second charging air conduit connects the other cooler with the inlets of the cylinders forming another row.

(4) The exhaust outlets of the supercharger turbines are placed between the turbocompressors and, if needed, proximal of the ends of the engine.

Even if the supercharging plant includes more than two waste gas turbines, the principle of the arrangement is the same, affording accessibility of the cylinder heads so that all parts of the engine can be conveniently supervised and serviced.

The air conduits connecting the superchargers of each row of cylinders with the respective air coolers may be arranged to terminate at the air cooler separately horizontally one above another or side by side, or they may be placed in inclined position and one above another. The first mentioned arrangement calls for an inclining or declining portion of the conduit connected with the turbocompressor which is distal of the cooler.

The side by side arrangement of the compressed air conduits affords a straight horizontal position of the conduits and improves the appearance of the power plant.

A horizontal straight position of the compressed air conduits can also be obtained by the provision of a common conduit extending parallel to the longitudinal axis of the engine and receiving compressed air from the individual compressors.

For engines having more than about sixteen cylinders it is recommended to interconnect the air inlet conduits for each row of cylinders so that the air pressure at the inlets of the cylinders of each cylinder row is the same.

An air supply conduit for each cylinder row may be connected with each cooler. In this case, the branch conduits, if such are found necessary, are preferably arranged crosswise with respect to the inlets of the conduits coming from the compressors. In this way it is assured that both branches receive the same amount of air from the compressors.

Figure 2:
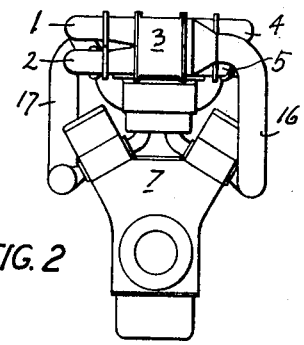
Figure 3:
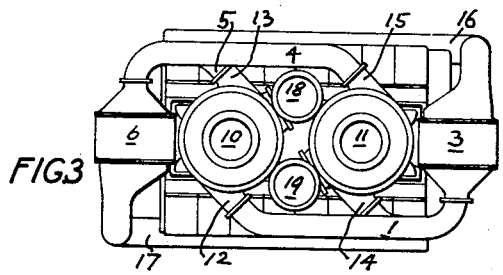
Figure 4:
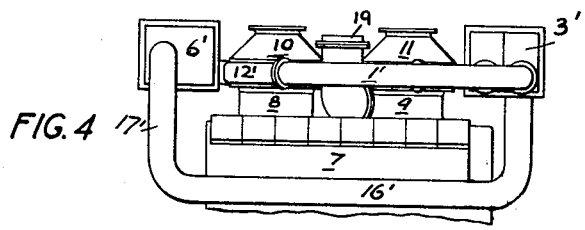
Figure 5:
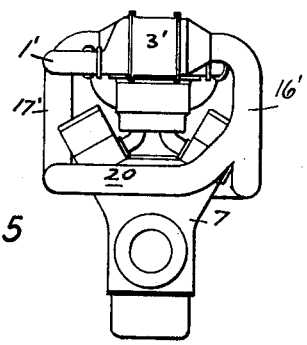
Figure 6:
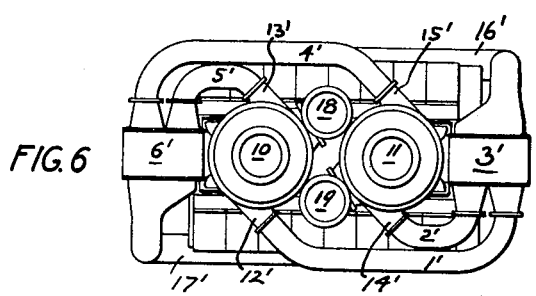
Figures 7, 8:
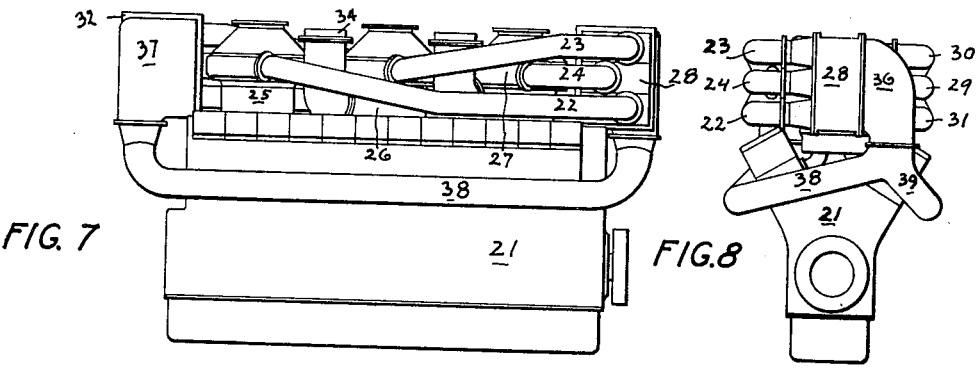
Figure 9:
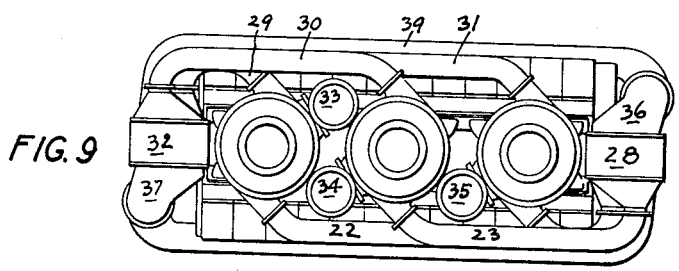
Figures 10, 11:
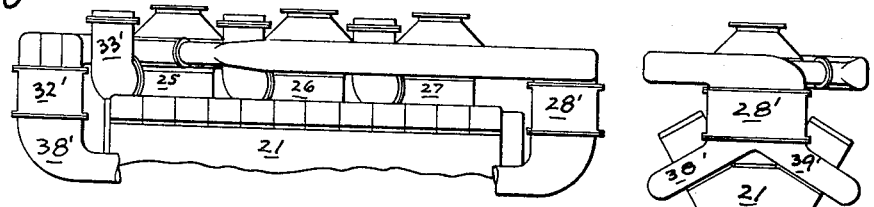
Figure 12:
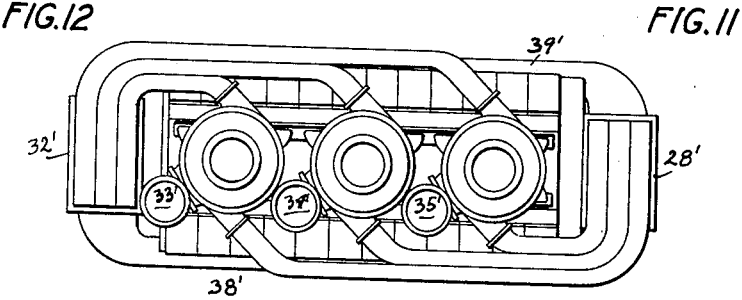

The novel features which are considered characteristic of the invention are set forth with particularity in the appended claims. The invention itself however and additional objects and advantages thereof will best be understood from the following description of embodiments thereof when read in conjunction with the accompanying drawing, in which:

Fig. 1 is a side view of a supercharger plant according to the invention;
Fig. 2 is an end view of the plant shown in Fig. 1;
Fig. 3 is a top view of the plant shown in Figs. 1 and 2;
Fig. 4 is a side view of a modified supercharger plant according to the invention;
Fig. 5 is an end view of the plant shown in Fig. 4;
Fig. 6 is a top view of the plant shown in Figs. 4 and 5;
Fig. 7 is a side view of a further modification of a supercharger plant according to the invention;
Fig. 8 is an end view of the plant shown in Fig. 7;
Fig. 9 is a top view of the plant shown in Figs. 7 and 8;
Fig. 10 is a side view of another modification of a supercharger plant according to the invention;
Fig. 11 is an end view of the plant shown in Fig. 10;
Fig. 12 is a top view of the plant shown in Figs. 10 and 11.

The same numerals designate the same parts in all figures.

Figs. 1, 2 and 3 illustrate an embodiment of the invention in which compressed air conduits 1 and 2 terminate separately, one above another, in a cooler, 3 and compressed air conduits 4 and 5 terminate separately, one above another, in a cooler 6.

Figs. 4, 5 and 6 show an embodiment in which the conduits 1' and 2' terminating in the cooler 3' are placed side by side, as are the conduits 4' and 5' which terminate in the cooler 6'.

In the modification shown in Figs. 1 to 6, numeral 7 designates a sixteen cylinder V-engine. Two radial exhaust gas driven turbocompressors 8 and 9 are placed with their rotation axis in the longitudinal vertical median plane of the engine. The fresh air enters the turbocompressors 8 and 9 from above through inlets 10 and 11, respectively. At diametrically opposed sides of the compressors compressed air outlets 12, 13 (12', 13') for the unit 8, and 14, 15 (14', 15') for the unit 9 are arranged. The compressed air is conducted from the compressor of the unit 8 through the conduits 1 and 5 and the conduits 1' and 5', respectively, in opposite direction to the coolers 3 and 6 and 3' and 6', respectively. The air compressed in the compressor of the unit 9 is conducted through the conduits 2 and 4 and the conduits 2' and 4' to the coolers 3 and 6 and 3' and 6', respectively. The coolers are individually located at the ends of the engine, approximately at the same elevation as the turbocompressor units. The exhaust of the turbines of the units 8 and 9 passes upwards through outlets 18 and 19, respectively, which are located between the units.

In the embodiment according to Figs. 1 to 3, the cooled air from the cooler 3 is conducted through a conduit 16 to the intake of one row of cylinders. The cooled air from the cooler 6 is conducted through a conduit 17 to the intake of the other row of cylinders.

In the embodiment shown in Figs. 4 to 6, the cooled air from the cooler 3' is conducted through a conduit 16' to the right row of cylinders, as seen in Fig. 5, and the cooled air from the cooler 6' is conducted through a conduit 17' to the left row of engine cylinders. The conduits 16' and 17' are interconnected by pressure equalizing conduits 20, of which only one is visible in the drawing.

Figs. 7 to 12 illustrate the application of the invention to a twenty-four cylinder V-engine.

Numeral 21 designates the engine which is provided with three supercharger units having axial air inlets.

In the modification shown in Figs. 7 to 9, compressed air conduits 22, 23, 24 connecting the units 25, 26, 27, respectively, with an air cooler 28 and compressed air conduits 29, 30, 31 connecting the units 25, 26, 27, respectively, with an air cooler 32 are arranged one above another. The units 25, 26, 27 are provided with exhaust gas outlets 33, 34, 35, respectively, which are placed between the units.

In the modification shown in Figs. 10 to 12, the exhaust gas outlets are all on the same side of the engine, so that one of the outlets (33') is placed proximal of one end of the engine. The compressed air conduits connecting the units 25, 26, 27 with the air coolers 28' and 32' are all arranged in one plane and side by side and the air flows through the coolers 28' and 32' in a vertical direction.

The air flows horizontally through the coolers 28 and 32 of the embodiment according to Figs. 7 to 9, as does the air in the embodiments according to Figs. 1 to 6. A collector 36 receives the cooled air from cooler 28 and a collector 37 receives the air cooled in the cooler 32. The cooled air is conducted to one cylinder row through conduit 38 and to the other cylinder row through a conduit 39. Since both conduits are connected to both collectors 36 and 37 there is substantially the same pressure at the air inlets of all engine cylinders.

The outlets 38' and 39' of the coolers 28' and 32' of the modification shown in Figs. 10 to 12 diverge symmetrically from the bottom of the coolers.

In the modifications shown in Figs. 4 to 6 and 10 to 12, a single compressed air conduit for conducting uncooled air from the compressors to the air coolers may be provided on each side of the engine instead of the two conduits visible in Fig. 6 and the three conduits visible in Fig. 12. This, of course, has the disadvantage that the air from the supercharger units is mixed prior to entering the air coolers.

Figs. 2, 5 and 11 show that with the arrangements according to the invention there is convenient access to the cylinder heads.

Ample room above the cylinder heads can also be provided in the arrangement according to Fig. 8, if the compressed air conduits 22 and 31 are placed above the conduits 23 and 30, respectively, and if the coolers 28 and 32 are placed at a higher elevation.

The power plants according to the invention can be so arranged that the connections for the cooling water, for lubrication, and for the fuel can be placed without difficulty. Likewise, the valve control mechanism, governors, filters, etc. can be conveniently arranged. The arrangement according to the invention in combination with any type of conventional engine is unified and compact, affording utmost use of the available space.

The exhaust gas from the cylinders of the internal combustion engine is admitted to the exhaust gas turbines in axial direction. The cylinders can be so coordinated, in the conventional manner, with the turbines and turbine inlet nozzles that the exhaust gas from one, two, or even three adjacent cylinders is fed into one group of inlet nozzles.

The two exhaust gas turbines of a sixteen cylinder engine may each be provided with six nozzle groups which receive the exhaust gas of eight neighboring cylinders, the first nozzle group receiving the exhaust gas from the first cylinder of a row on one side of the engine, the second nozzle group receiving the exhaust gas from the second and third cylinder, and the third nozzle group receiving the exhaust gas from the fourth cylinder of the row, the other three nozzle groups receiving the exhaust gas in a specular arrangement from the first four engine cylinders of the row of cylinders at the other side of the engine.

Groups of eight cylinders of a twenty-four cylinder engine may be arranged in the same way as described in the paragraph next above for feeding one of three exhaust gas turbines.

Only two exhaust gas turbines may be combined with a twenty-four cylinder motor, each turbine being provided with four nozzle groups, each group being fed from three neighboring cylinders or with six nozzle groups, each group being fed from two neighboring cylinders.

Of course, more than three turbocompressor units may be combined with a twenty-four cylinder motor, the nozzle groups of the turbines being arranged accordingly.

What is claimed is:

1. A supercharger plant for internal combustion engines having a plurality of specularly positioned rows of cylinders, said plant comprising at least two exhaust gas operated radial turbocompressors to which the air to be compressed is admitted in axial direction, the shafts of said turbocompressors being vertical and placed side by side substantially in the longitudinal vertical median plane of and above the engine, two coolers for cooling the compressed air, individually disposed at the ends of the engine, compressed air outlets provided in diametrically opposed position on each of said turbocompressors, compressed air conduit means connecting one of said coolers with one air outlet of each turbocompressor, compressed air conduit means connecting the other of said coolers with the diametrically opposed air outlet of each turbocompressor, a compressed air conduit connecting one of said coolers with the cylinders of one row of cylinders, a compressed air conduit connecting the other of said coolers with the cylinders of another row of cylinders, and turbine exhaust outlets individually connected with said turbocompressors and being disposed substantially between said turbocompressors.

2. A supercharger plant for internal combustion engines having a plurality of specularly positioned rows of cylinders, said plant comprising at least two exhaust gas operated radial turbocompressors to which the air to be compressed is admitted in axial direction, the shafts of said turbocompressors being vertical and placed side by side substantially in the longitudinal vertical median plane of and above the engine, two coolers for cooling the compressed air individually disposed at the ends of the engine, compressed air outlets provided in diametrically opposed position on each of said turbocompressors, one of said outlets of each turbocompressor being placed on one side of the vertical longitudinal median plane of the engine and the other of said outlets of each turbocompressor being placed on the other side of the vertical longitudinal median plane of the engine, conduits for uncooled compressed air individually connecting the air outlets on one side of the vertical longitudinal median plane of the engine with one of said coolers, conduits for uncooled compressed air individually connecting the air outlets on the other side of the vertical longitudinal median plane of the engine with the other of said coolers, a conduit for cooled compressed air connecting one of said coolers with the cylinders of one row of cylinders, a conduit for cooled compressed air connecting the other of said coolers with the cylinders of another row of cylinders, and turbine exhaust outlets individually connected with said turbocompressors and being disposed substantially between said turbocompressors.

3. A supercharger plant as defined in claim 2, in which said conduits for uncooled compressed air terminate at the respective coolers one above another.

4. A supercharger plant as defined in claim 2, in which said conduits for uncooled compressed air terminate at the respective coolers side by side.

5. A supercharger plant for internal combustion engines having a plurality of specularly positioned rows of cylinders, said plant comprising at least two exhaust gas operated radial turbocompressors to which the air to be compressed is admitted in axial direction, the shafts of said turbocompressors being vertical and placed side by side substantially in the longitudinal vertical median plane of and above the engine, two coolers for cooling the compressed air individually disposed at the ends of the engine, compressed air outlets provided in diametrically opposed position on each of said turbocompressors, compressed air conduit means connecting one of said coolers with one air outlet of each turbocompressor, compressed air conduit means connecting the other of said coolers with the diametrically opposed air outlet of each turbocompressor, a compressed air conduit connecting one of said coolers with the cylinders of one row of cylinders, a compressed air conduit connecting the other of said coolers with the cylinders of another row of cylinders, said last two mentioned compressed air conduits being interconnected, and turbine exhaust outlets individually connected with said turbocompressors and being disposed substantially between said turbocompressors.

No references cited.